United States Patent [19]

Forsten

[11] Patent Number: 5,171,339
[45] Date of Patent: Dec. 15, 1992

[54] FILTER BAG FOR HOT GASES

[75] Inventor: Herman H. Forsten, Hockessin, Del.

[73] Assignee: E. I. Du Pont de Nemours and Company, Wilmington, Del.

[21] Appl. No.: 787,999

[22] Filed: Nov. 7, 1991

[51] Int. Cl.[5] .................. B01D 39/08; B01D 39/16; B01D 46/02

[52] U.S. Cl. .................................... 55/379; 55/382; 55/486; 55/528; 428/300; 428/474.7

[58] Field of Search ............... 55/486, 528, DIG. 5, 55/379, 382; 428/234, 280, 287, 300, 474.7

[56] References Cited

U.S. PATENT DOCUMENTS

| | | | |
|---|---|---|---|
| 2,910,763 | 11/1959 | Lauterbach | 55/528 X |
| 3,231,092 | 1/1966 | Goldman | 55/486 X |
| 3,871,850 | 3/1975 | Lenane | 55/528 X |
| 3,920,428 | 11/1975 | Kinsley, Jr. | 55/528 |
| 4,100,323 | 7/1978 | Forsten | 55/528 X |
| 4,197,100 | 4/1980 | Hausher | 55/528 X |
| 4,255,817 | 3/1981 | Heim | 428/474.7 X |
| 4,361,619 | 11/1982 | Forsten et al. | 428/234 |
| 4,522,876 | 6/1985 | Hiers | 55/486 X |
| 4,531,957 | 7/1985 | Malik | 55/486 X |
| 4,536,439 | 8/1985 | Forsten | 428/280 |
| 4,698,414 | 10/1987 | Bair | 428/474.7 X |
| 4,726,987 | 2/1988 | Trask et al. | 428/300 X |
| 4,743,495 | 5/1988 | Lilani et al. | 428/300 X |
| 4,780,359 | 10/1988 | Trask et al. | 428/300 X |
| 4,840,838 | 6/1989 | Wyss | 55/528 X |
| 4,917,714 | 4/1990 | Kinsley, Jr. | 55/528 X |
| 5,080,847 | 1/1992 | Hazeyama | 55/DIG. 5 |

FOREIGN PATENT DOCUMENTS

| | | | |
|---|---|---|---|
| 51-010470 | 1/1976 | Japan | 55/528 |
| 55-127121 | 10/1980 | Japan | 55/528 |
| 63-236512 | 10/1988 | Japan | 55/528 |
| 1-274813 | 11/1989 | Japan | 55/528 |
| 2-071809 | 3/1990 | Japan | 55/528 |

*Primary Examiner*—Robert Spitzer

[57] ABSTRACT

As a cloth for filter bags, a laminate comprising thin layer of nonwoven poly(p-phenylene terephthalamide) needled to a felt of poly(m-phenylene isophthalamide), polyester or polyphenylenesulfide fiber felt increases the resistance to burn through by hot sparks.

2 Claims, 1 Drawing Sheet

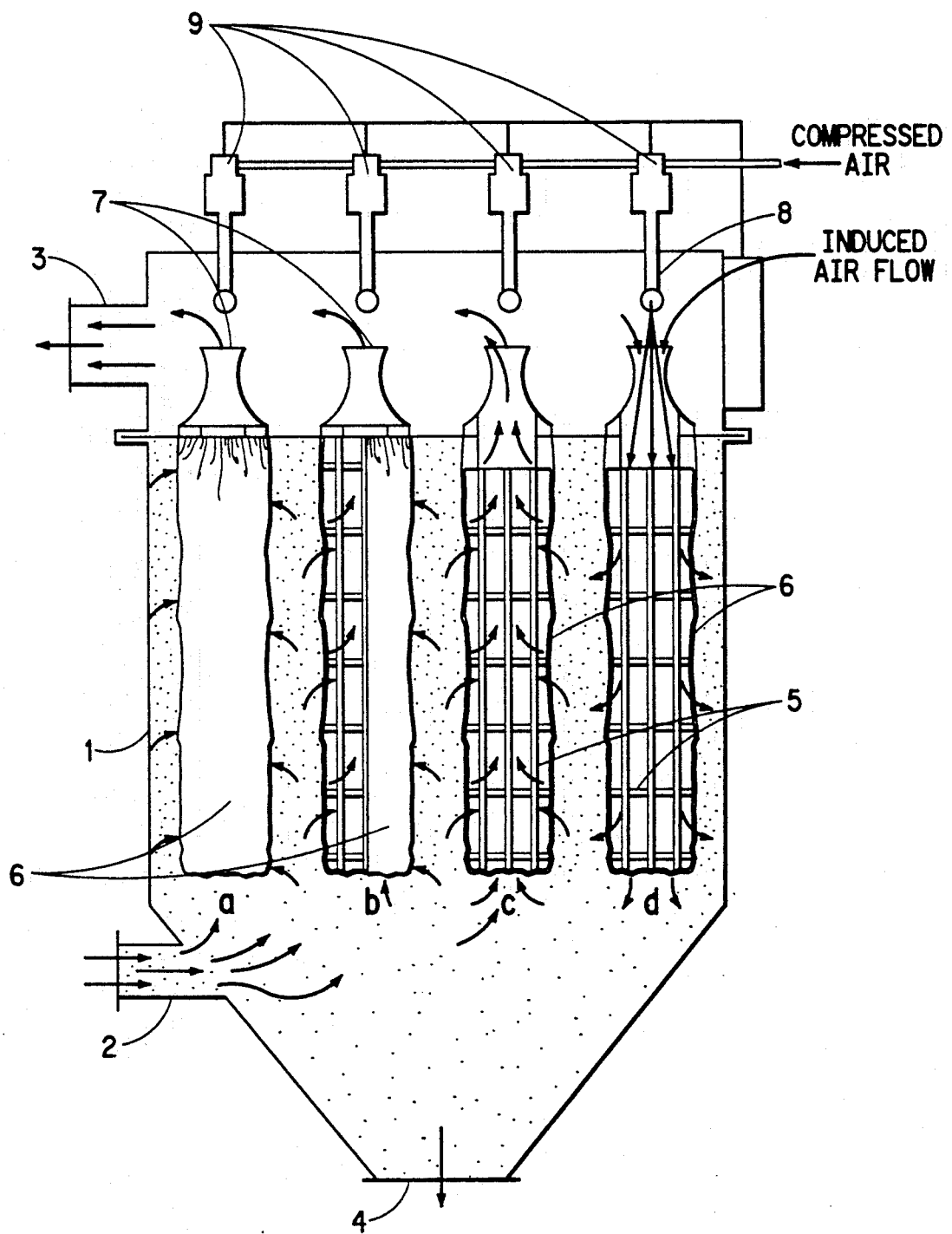
FIGURE

FILTER BAG FOR HOT GASES

BACKGROUND OF THE INVENTION

The use of fabric filters has grown significantly as environmental standards for particulate emissions have become more stringent. Fabric filters are used because they are highly efficient, easily operated and in many cases the least expensive method of control. Selection of the type of fabric filter equipment is usually governed by the nature of the particulate to be collected, i.e., reverse air or shaker units for fumes and submicron particles and jet pulse units for coarse, non-tacky dusts.

Several factors should be considered when deciding upon the type baghouse fabric to be used. Included are: (1) operating temperature (2) abrasion resistance (3) filtering performance and (4) chemical resistance. Filtering performance is determined by the complex interaction of fiber and fabric structure with the dust to be collected.

It is apparent that the selection of filter bag fabric is of extreme importance since one fabric may last much longer than other fabrics in the same environment.

THE FIGURE

The FIGURE shows a schematic of a typical bag filter chamber.

SUMMARY OF THE INVENTION

The present invention provides a bag filter that is highly resistant to hot particles entrained in exhaust gaseous streams, comprising a bag retainer clothed in a filter bag, the cloth of said filter bag comprising a laminate of a felt of poly(m-phenylene isophthalamide), polyester or polyphenylenesulfide fibers having a thin nonwoven fabric layer of poly(p-phenylene terephthalamide) fibers needled thereto, the poly(p-phenylene terephthalamide) fabric being positioned at the surface of the filter bag first exposed to the hot particle laden gas stream. The poly(p-phenylene terephthalamide) fabric has a preferred basis weight of from 1 to 2 oz-/yd$^2$. Also encompassed by this invention is the laminate employed as the filter bag cloth.

DETAILED DESCRIPTION OF THE INVENTION

The FIGURE shows a schematic of chamber housing bag filters at two stages of operation. It encompasses a chamber 1 having a passageway 2 through which hot, dust laden air enters and exit channel 3 through which filtered air proceeds to exhaust. Particulate material which is separated from the dust laden air stream is ultimately removed through discharge opening 4. Disposed within chamber 1 are four bag filters a, b, c, and d, that separate the dust from the dust laden air stream, each comprising a bag retainer 5 (not shown in bag filter a, and only partially shown in bag filter b,) which is commonly a metal cage or form made of wire. The filter bag 6 shown in bag filter a and partially shown in bag filter b is shown in cross-section in bag filter c and d. At the top of each bag filter is an opening 7 from which filtered gas leaves the bag filter or into which compressed air can be introduced through blow pipes 8 operated by solenoid valves 9 or with other mechanisms.

In operation described with respect to bag filter a, hot dust laden air enters chamber 1 through passageway 2 through filter bag 6 of bag filter a as shown by the direction of the arrows, and leaves the bag through opening 7 into a chamber from which the filtered air is exhausted through exit channel 3. After a predetermined period of operation, the flow of dust laden air is halted and the second stage of operation is commenced as described with respect to bag filter d. Compressed air is introduced through valve 9 and blow pipe 8 into opening 7. The compressed air travels through the filter bag in a direction opposite to the earlier hot dust laden air flow, and frees particulate which is entrapped on the filter bag. The particulate is removed along with the air flow, through discharge opening 4.

The important elements of the present invention relate to the filter bag cloth. The cloth is normally a felt (an entangled mass of fiber, as formed by needling) of a fiber having a basis weight of from about 12 to 22 oz-/yd$^2$, a balance of toughness, abrasion resistance filtering capability and which can stand the gaseous environment at the elevated temperatures at which it must be employed. Felts of poly(m-phenylene isophthalamide) are particularly effective at high temperatures, e.g., 375°–400° F. Polyphenylenesulfide fiber felts can also be employed at relatively elevated temperatures. Polyethylene terephthalate fiber felts are employed at lower temperatures, e.g., 250–275° F.

It has been noted that hot sparks entrained in exhaust gaseous streams are often carried into the baghouse and burn holes through the filter bags, severely decreasing their effectiveness as filters. In accordance with the present invention, it has been found that the presence of a thin non-woven fabric layer of poly(p-phenylene terephthalamide) fibers situated at the filter surface first exposed to the hot gas stream and needled to the base felt of poly(m-phenylene isophthalamide) or polyester fiber greatly increases the resistance of burn through by hot sparks. The layers may be needled together by conventional needling means, but may be hydraulically needled as shown in U.S. Pat. Nos. 3,402,862 and 3,493,462. Preferably the basis weight of the nonwoven layer of poly(-p-phenylene terephthalamide) fiber is from 1 to 2 oz/yd$^2$ or about 5 to 15 wt. % of the underlying bag cloth, although heavier layers may be employed. The advantages of using a thin nonwoven fabric layer of poly(p-phenylene terephthalamide) fiber is that it keeps costs down, and does not materially increase pressure drop across the filter cloth while affording a great deal of protection.

TESTS AND PROCEDURES

The test employed to evaluate the effectiveness of the filter cloth simulates the exposure of a fabric structure to hot particulate that may be carried into a baghouse by the entering gas stream and assesses the damage to the fabric. It is performed as follows:

Principle: Steel shot in various sizes is heated in a muffle furnace to a temperature of 800° C. It is placed on the surface of the test fabric and the damage is determined.

Equipment: 1. Steel balls as follows:

| Size-in. | Wt.-mg |
|---|---|
| 0.125 | 130 |
| 0.25 | 1200 |
| 0.5 | 9500 |

2. A muffle furnace capable to heating to over 800° C.

3. An 8×10 in. metal pan in which to place the test fabric.
4. A crucible in which to place the steel balls.
5. Crucible tongs Environment for conditioning and exposing the fabric is 20° C. and 50–60 relative humidity.

Test samples should be 8×10 in. to fill the pan.

Sample Preparation: Samples should be cut and placed in the pan, test surface up and held in the test environment for 24 hrs.

Test Procedure: Place 4 steel balls of each size in a crucible and place in the muffle furnace at 800° C. Heat at least 2 hours. Remove the crucible from the furnace and pour the steel balls on the fabric within 3 sec.

Evaluation: Observe any ignition, smouldering, and afterglow. Remove the balls from the surface and measure the diameter of the burn spot and the depth of penetration.

Report: Ignition, burn through, burn area, depth and other observations.

The following examples are illustrative of the invention and are not intended as limiting.

EXAMPLE 1

This example deals with the application of a lightweight nonwoven poly(p-phenylene terephthalamide) (PPD-T) fabric (100% Kevlar® aramid spunlaced nonwoven weighing 2 oz/sq.yd) to the surface of a high temperature poly(m-phenylene isophthalamide) fiber (MPD-I) 14 oz/sq. yd. needle punched filtration felt. The PPD-T fabric was needle punched to the surface of the felt using 36 gauge 9 barb felting needles with an 8 mm penetration and 77 penetrations per inch (ppi).

The thermal protection was demonstrated by using the above described test, in which ⅛ in. and ¼ in. steel shot was heated to 800° C. in a muffle furnace. The heated shot was removed from the furnace and immediately poured on to the PPD-T fabric surface. After 30 sec., the shot was removed and the surface inspected. The unprotected MPD-I felt showed severe charring and penetration into the felt. The ⅛ in. shot charred an area equal to its diameter and penetrated 1/32 in. (25% of the thickness). The ¼ in. shot which has 10 times the heat content of the ⅛ in. shot, charred an area greater than its diameter and penetrated approximately 1/16 in. (50% of the felt thickness). In contrast, the PPD-T fabric surface showed no penetration by the shot. The ⅛ in. shot simply discolored the surface, while the ¼ in. shot only charred the surface. No effects were visible on the back side of the fabric.

EXAMPLE 2

The same PPD-T fabric fabrication method and test procedure as described in Example 1 was followed except that a polyester, (polyethylene terephthalate), felt was substituted for the MPD-I felt. The polyester felt (16 oz/sq.yd.) is typical of those used to collect particulate in the metals industry. When the shot was poured on to the surface of the unprotected polyester felt, both the ⅛ in. and the ¼ in. shot melted straight through the felt leaving holes even larger than the shot diameter, while the polyester felt with the PPD-T surface showed no penetration of the ⅛ in. or ¼ in. shot through the PPD-T surface. With the ⅛ in. shot no evidence of the hot particles was seen on the back side of the felt. The ¼ in. shot did show some discoloration on the back side. Satisfactory performance will also be observed with polyphenylenesulfide fibers.

I claim:

1. A bag filter that is highly resistant to hot particles entrained in exhaust gaseous streams, comprising a bag retainer clothed in a filter bag, the cloth of said filter bag comprising a laminate of a felt of poly(m-phenylene isophthalamide), polyester or polyphenylenesulfide fibers having a thin nonwoven fabric of poly(p-phenylene terephthalamide) fibers needled thereto, the poly(p-phenylene terephthalamide) fabric being positioned at the surface of the filter bag first exposed to the hot particle laden gas stream.

2. A bag filter in accordance with claim 1 wherein the poly(p-phenylene terephthalamide) fabric has a basis weight of from 1 to 2 oz/yd$^2$.

* * * * *